United States Patent [19]

Dolenc

[11] Patent Number: 4,494,700
[45] Date of Patent: Jan. 22, 1985

[54] FUEL INJECTION NOZZLE FOR AIR-COMPRESSING, SELF-IGNITING RECIPROCATING INTERNAL COMBUSTION ENGINES

[75] Inventor: Anton Dolenc, Vienna, Austria

[73] Assignee: Steyr-Daimler-Puch Aktiengesellschaft, Vienna, Austria

[21] Appl. No.: 552,809

[22] Filed: Nov. 17, 1983

[30] Foreign Application Priority Data

Dec. 14, 1982 [AT] Austria .................................. 4536/82

[51] Int. Cl.³ .......................................... F02M 61/04
[52] U.S. Cl. ................................................. 239/533.3
[58] Field of Search ................. 239/533.2, 533.12, 584

[56] References Cited

FOREIGN PATENT DOCUMENTS 2711350 9/1978 Fed. Rep. of Germany ... 239/533.9

*Primary Examiner*—Andres Kashnikow
*Attorney, Agent, or Firm*—Kurt Kelman

[57] ABSTRACT

A fuel injection nozzle for air-compressing, self-igniting reciprocating internal combustion engines, particularly for such engines arranged for a direct injection of fuel, comprises an axially slidable and axially guided, spring-biased valve needle for closing the nozzle orifices in the nozzle tip. Fuel is supplied to an annular chamber through a transverse bore and an axial bore of the valve needle to a plenum chamber, which is defined by the valve seat cooperating with the valve needle. Between the plenum chamber and the means for guiding the valve needle, the outside peripheral surface of the latter is surrounded by a clearance space, which is adapted to be flushed with fuel. In order to ensure a tight seal between the valve needle and the valve seat and to prevent a discharge of fuel during the closing operation of the valve needle, also to facilitate the flow of fuel through the nozzle orifices and to ensure a cooling action, the valve seat comprises a plurality of annular elevations, which surround respective inlet openings of the nozzle orifices and have inwardly facing surfaces which face and conform to adjacent surface portions of the end portion of the valve needle. The clearance space is directly or indirectly connected to the annular chamber regardless of the position of the valve needle.

4 Claims, 6 Drawing Figures

4,494,700

FUEL INJECTION NOZZLE FOR AIR-COMPRESSING, SELF-IGNITING RECIPROCATING INTERNAL COMBUSTION ENGINES

BACKGROUND OF THE INVENTION

This invention relates to a fuel injection nozzle for air-compressing, self-igniting reciprocating internal combustion engines, particularly for such engines arranged for a direct injection of fuel, comprising an axially slidable and axially guided, spring-biased valve needle for closing the nozzle orifices in the nozzle tip, and a fuel supply conduit leading into an annular chamber, which surrounds the valve needle and communicates through a transverse bore and an axial bore of the valve needle with a plenum chamber, which is defined by the valve seat cooperating with the valve needle. The valve needle is surrounded with a clearance space, which is flushed with fuel and is disposed between the plenum chamber and the means for guiding the valve needle in the nozzle tip.

A known fuel injection nozzle of that kind is disclosed in Laid-open German Application No. 27 11 350 and comprises a conical valve seat and a valve needle having a conical end portion, which cooperates with the seat and has a larger included angle than the seat. As a result, the plenum chamber is sealed from the nozzle orifices by a line seal, which is formed between the conical end portion of the valve needle and the conical valve seat of the fuel injection nozzle. In such fuel injection nozzle, a reliable seal cannot be ensured for a prolonged time because wear will inevitably occur. Besides, when the valve needle is in its closed position, the clearance space provided between the plenum chamber and the means for guiding the valve needle in the nozzle tip is separated from the plenum chamber and from the bore which is formed in the valve needle and opens into that plenum chamber when the valve needle is in its open position. As the valve needle approaches the valve seat, part of the fuel contained in the clearance space must be displaced from said clearance space. Because the approach of the valve needle to the valve seat results in a progressive decrease of the cross-section which is available for the transfer of fuel from the clearance space into the axial bore leading to the annular chamber, the rate at which fuel enters through the nozzle orifices into the combustion chamber will progressively increase so that the fuel will not be completely burnt in the combustion chamber and polluting unburnt hydrocarbons will be exhausted at an increasing rate. It must be borne in mind that the nozzle orifices are not entirely sealed in any case because the plenum chamber and the nozzle orifices are separated only by the line seal between the valve needle and the valve seat in the nozzle tip. Besides, the clearance space disposed between the plenum chamber and the means for guiding the valve needle in the nozzle tip is not continuously flushed with fuel, although such flushing is desirable for a cooling of the valve needle and the associated guiding means.

SUMMARY OF THE INVENTION

It is an object of the invention to eliminate these disadvantages and so to improve a fuel injection nozzle of the kind described first hereinbefore that the outflow of fuel during the closing movement of the valve needle is decreased, a tight seal between the valve seat is ensured, the flow through the nozzle orifices is facilitated and a certain cooling effect is achieved.

This object is accomplished in accordance with the invention in that the valve seat consists of a plurality of annular elevations, each of which surrounds the adjacent inlet opening of one of the nozzle orifices and is preferably concentric to the associated inlet opening, said elevations have inwardly facing surfaces, which face and conform to the adjacent surface portions of the end portion of the valve needle, and the clearance space is directly or indirectly connected to the annular chamber by at least one passage regardless of the position of the valve needle.

As a result of the design according to the invention, the fuel can uniformly enter the nozzle orifices from all sides as soon as the needle valve has disengaged the valve seat. For this reason an abrupt beginning of the fuel injection is ensured and the flow through the nozzle orifices is facilitated. The fuel reaches the nozzle orifices through the axial bore of the valve needle and through the fuel-flushed clearance space so that the valve needle and the means for guiding the valve needle are cooled to some extent. As the valve needle is closed, the fuel between said valve needle and the valve seat is displaced and can flow back to the fuel injection pump through the axial bore of the valve needle and through the above-mentioned passage, so that the cross-section of flow is increased and the resistance to flow is decreased. For this reason a low differential pressure will be sufficient for the acceleration and return flow of the surplus fuel so that the needle will close more quickly. The clearance space can be emptied more easily and any fuel contained therein will not be forced out through the nozzle orifices so that an incomplete combustion of such fuel in the combustion chamber owing to an inadequate atomization of the fuel is prevented. A very rapid pressure drop in the plenum chamber may be expected and this fact will contribute to an inhibition of an after-dripping or after-spraying of fuel from the nozzle. Finally, the nozzle orifices will be perfectly sealed because the contact pressure between the valve needle and the valve seal will be increased so that the sealing action will be improved. Owing to the annular elevations surrounding the nozzle orifices, the valve-opening pressure will be applied to a larger surface of the valve needle so that the valve needle will open more reliably and the difference between the valve-opening pressure and the valve-closing pressure will be reduced, as is desired.

The above-mentioned passage may consist of a transverse bore, which connects the clearance space to the axial bore of the valve needle. This is a particularly simple design. The cross-section which is available for the return flow can be increased further in that the above-mentioned passage consists of at least one longitudinal passage extending between the valve needle and the inside peripheral surface of the nozzle tip. This design will result in a higher return flow rate.

BRIEF DESCRIPTION OF THE DRAWINGS

Illustrative embodiments of the invention are shown in the drawings, in which.

DETAILED DESCRIPTION

Figure 1:
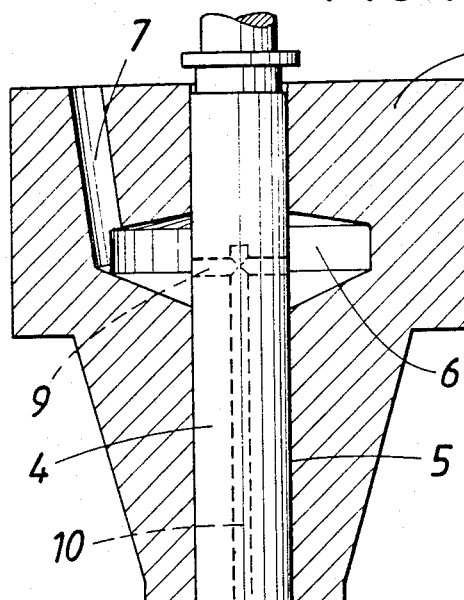
FIG. 1 is an axial sectional view showing those parts of a fuel injection nozzle which are essential for the invention.

The nozzle body 1 terminates in a hollow nozzle tip 2, which is formed with nozzle orifices for ejecting fuel. These nozzle orifices 3 can be closed by a valve needle 4, which is biased by a spring, not shown. The valve needle 4 is slidably mounted in a guide 5 formed by the inside peripheral surface of the nozzle tip 2. That guide 5 is adjoined at the rear by an annular chamber 6, which surrounds the valve needle 4 in the valve body 1. A fuel supply conduit 7 is connected to the pressure side of a fuel injection pump and opens into said annular chamber 6. A valve seat for cooperating with the adjacent conical end portion of the valve needle is formed by a plurality of annular elevations 8, which concentrically surround the inlet openings of respective nozzle orifices 3 and have surfaces which face and conform to adjacent surface portions of the conical end portion of the valve needle 4.

A plenum chamber 11 is defined by the elevations 8 and the end portion of the valve needle 4 and communicates with the annular chamber 6 through a transverse bore 9 and an axial bore 10, which are formed in the valve needle 4. The valve needle 4 is surrounded by a clearance space 12, which is disposed between the guide 5 and the plenum chamber 11. The latter is defined by the elevations 8, which constitute a valve seat cooperating with the valve needle 4. That clearance space 12 communicates with the annular chamber 6 directly or indirectly through at least one passage.

Figure 3:
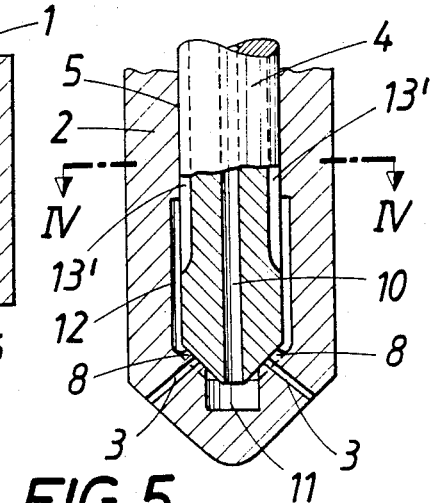
FIG. 3 is an axial sectional view showing that end of a fuel injection nozzle of another embodiment which is near the cylinder.
Figure 2:
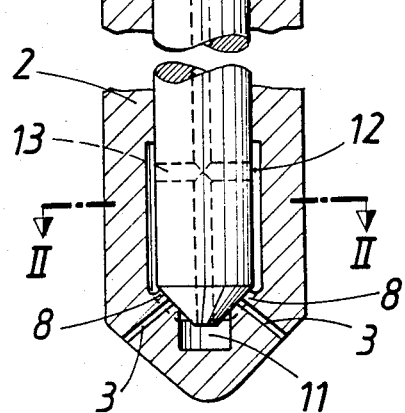
FIG. 2 is a transverse sectional view taken on line II—II in FIG. 1 with the valve needle omitted.
Figure 5:
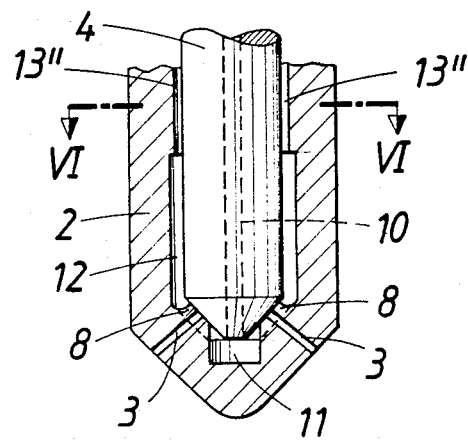
FIG. 5 is a view that is similar to FIG. 3 and illustrates a modification and FIG. 6 is a transverse sectional view taken on line VI—VI in FIG. 5.
Figure 2:
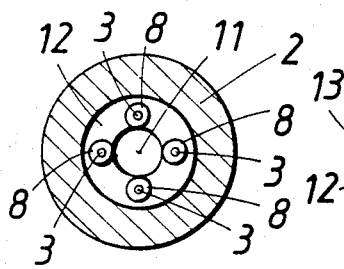
Figure 4:
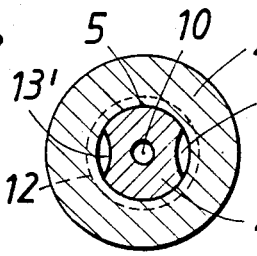
FIG. 4 is a transverse sectional view taken on line IV—IV in FIG. 3.
Figure 6:
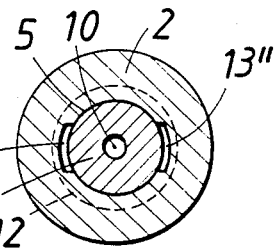

In accordance with FIG. 1 that passage consists of a transverse bore 13, which connects the clearance space 12 to the axial bore 10 of the valve needle 4. In the embodiment shown in FIGS. 3 and 4, the clearance space 12 and the annular chamber 6 are connected by two passages, which consist of longitudinal grooves 13' formed in the valve needle 4. In the embodiment shown in FIGS. 5 and 6, two of said connecting passages consist of respective grooves 13" formed in the nozzle tip 2.

What is claimed is:

1. In a fuel injection nozzle for air-compressing, self-igniting, reciprocating internal combustion engines, comprising a nozzle body comprising a hollow nozzle tip having an inside peripheral surface and valve seating means facing the interior of said nozzle tip and a plurality of nozzle orifices, which have inlet openings in said valve seating means and are open on the outside of said nozzle tip, and a valve needle, which is axially slidably mounted in said nozzle body and nozzle tip and comprises an end portion, which faces said valve seating means and is adapted to cooperate with it so as to open and close said inlet openings, said nozzle tip comprising guiding means formed on said inside peripheral surface and serving to axially guide said valve needle, said valve needle being retractable from said valve seating means to an open position, in which said inside peripheral surface, said valve seating means and said end portion define a plenum chamber, said inside peripheral surface and said valve needle defining around said valve needle between said end portion and said guiding means a clearance space, which is open at said end portion, said nozzle body defining with said valve needle an annular chamber on the side of said guiding means that is opposite to said valve seating means, said nozzle body being formed with a fuel inlet communicating with said annular chamber, said needle valve being formed with an axial bore, which is open on said end portion, and with a transverse bore, which communicates with said axial bore and with said annular chamber regardless of the position of said valve needle, the improvement residing in that said valve seating means comprise a plurality of annular elevations, which surround respective ones of said inlet openings and have surfaces which face and conform to adjacent surface portions of said valve needle and are adapted to cooperate with said adjacent surface portions to open and close said inlet openings, and passage means are provided, through which said clearance space communicates with said annular chamber regardless of the position of said valve needle.

2. The improvement set forth in claim 1 wherein said passage means comprise at least one transverse bore, which is formed in said valve needle and communicates with said axial bore and is open to said clearance space regardless of the position of said valve needle.

3. The improvement set forth in claim 1, wherein said passage means comprise at least one passage which is defined by said needle valve and said inside peripheral surface and communicates with said clearance space and with said annular chamber.

4. The improvement set forth in claim 1, wherein each of said inlet openings is concentrically surrounded by one of said annular elevations.

* * * * *